Sept. 5, 1967             J. W. RAPP             3,339,238

POSITIVE PRESSURE APPLICATOR

Filed May 2, 1966

INVENTOR
JAY W. RAPP
BY
*Robert J. Schaap*
ATTORNEY

United States Patent Office 3,339,238
Patented Sept. 5, 1967

3,339,238
POSITIVE PRESSURE APPLICATOR
Jay W. Rapp, Park Ridge, Ill., assignor to Monsanto Company, St. Louis, Mo., a corporation of Delaware
Filed May 2, 1966, Ser. No. 546,790
9 Claims. (Cl. 18—19)

ABSTRACT OF THE DISCLOSURE

A pressure applicator in the form of a solid housing which is designed to extend around a plug of a molding machine. The pressure applicator has a flexible gripping ring which engages a thermoplastic web as the plug forces the web into a molding cavity. Pressure is injected between the pressure applicator and the die. The applicator is grooved on its underside for retaining a flexible compression member giving a biasing action to the applicator. A metallic shoe is then disposed beneath the bias member.

---

Figure 2:
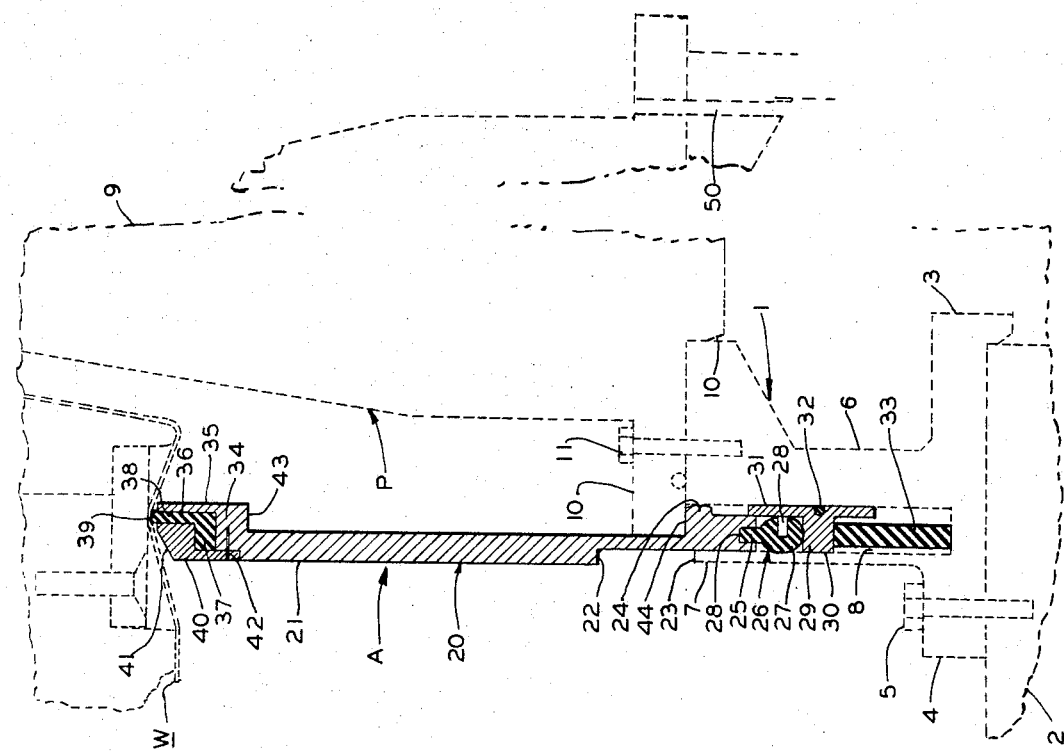

This invention relates in general to certain new and useful improvements in an apparatus and method for forming thermoplastic articles, and more particularly, to a positive pressure forming apparatus and method employed in the molding of thermoplastic articles.

Today, there have been widespread advancements in the packaging industry with the introduction of containers formed of plastic and synthetic resinous materials. In fact, it has become a common practice to manufacture thin-walled disposable containers such as drinking cups, ice cream cups and the like from moldable, thermoplastic materials such as polystyrene and modified polystyrene. There are a large number of commercially available molding machines which are designed to form thin-walled containers from sheets of thermoplastic material. In this art of forming articles from thermoplastic materials, the injection molding and pressure molding methods have been most advantageously employed. Molding machines which employ the pressure molding method generally comprise a device for feeding a sheet of thermoplastic material, either intermittently or continuously, between cooperating dies. The dies are adapted to engage the movable web of thermoplastic material generally in a shifting movement and form the plastic material to a shape generally conforming to that of the receiving die.

The pressure or so-called vacuum molding process employs the vacuum as an assist for drawing the thermoplastic web into the die along with the mechanical engagement of the web. It has been found that the overall thickness of the walls of the article produced are more uniform when a vacuum assist is employed with the mechanical engagement of the web in causing the deformation of the web. This type of device is designed so that the side of the sheet which is formed by the male die is generally maintained at atmospheric pressure while the side of the sheet which is formed within the female die is maintained at pressures less than atmospheric pressure to provide the vacuum forming of the plastic article. Moreover, this type of operation generally eliminates undesirable flow lines which present an undesirable appearance to the finally shaped article. There have been recent attempts to employ positive air pressure assists around the male die to obtain a greater pressure differential. However, all of such attempts, to date, have been ineffective for a number of reasons.

Devices of this latter mentioned type, namely the devices which employ the differential air pressure must necessarily include an effective sealing means between the die frames in order to achieve adequate pressure differential. In many of these devices, the die frames may shift on a suitable carriage longitudinally with the moving web, as the web is fed continuously into the molding machine. The die frames reciprocatively shift longitudinally for a predetermined distance and are then automatically returned to their initial position. In other devices, the die frames are stationarily mounted with respect to the web and the web is intermittently halted in its operation during the actual molding. However, in each of these devices it is quite difficult to maintain adequate sealing between the thermoplastic web and the male and female die frame so that both a positive pressure and a vacuum assist may be employed on opposite sides of the web. This problem is even more considerable when the plastic web and the continuously moving die frames are operating at relatively high rates of speed.

The devices of the prior art attempted to overcome the sealing problem by employing a sealing frame which completely surrounded all of the individual dies which were located on a die frame. Thus, the pressure frame would extend around the periphery of each of the die frames and was adapted to engage the margins of the web as selected portions of the web were engaged by the cooperating individual pairs of dies. A pressurized condition was then maintained on the interior of the pressure frame. However, this method proved rather ineffective inasmuch as a rather large area of the web was exposed to the pressure conditions and hence uniform pressure was not maintained on all portions of the surface of the web. Moreover, it was very difficult to seal the entire periphery of the web and pressure leaks often developed. A more important problem arose in the shifting of the platens or die frames. Since pressure conditions were maintained on the entire platen or die frame, a tremendous force was exerted in a direction perpendicular to the surface of the platen thereby increasing the problems of sealing the individual die against the selected portion of the thermoplastic web. These problems seriously hampered positive pressure forming, and moreover, seriously reduced the forming speed of the various machines.

It is, therefore, the primary object of the present invention to provide a positive pressure applicator which is capable of being used with the plug assembly in a molding machine and adapted to provide a positive pressure seal between a web of thermoplastic material and cooperating die frame which shift into and out of contact with the thermoplastic material.

It is another object of the present invention to provide a positive pressure applicator of the type stated which is capable of being used in molding machines employing continuously moving webs of moldable material and with molding machines which intermittently halt the movement of a thermoplastic web during molding operations thereof.

It is a further object of the present invention to provide a positive pressure applicator of the type stated which is capable of rapidly achieving an air-tight seal by engagement with a web of thermoplastic material during the forming operation and rapidly breaking the air-tight seal thereafter.

It is an additional object of the present invention to provide a method of gripping a web of thermoplastic material during the shaping thereof along the working edges and applying a control thinning pressure to such edge portions.

It is also an object of the present invention to provide a positive pressure applicator and method of the type stated which may be used in high volume production capacity machines.

With the above and other objects in view, my invention resides in the novel features of form, construction, arrangement and combination of parts presently described and pointed out.

Figure 1:
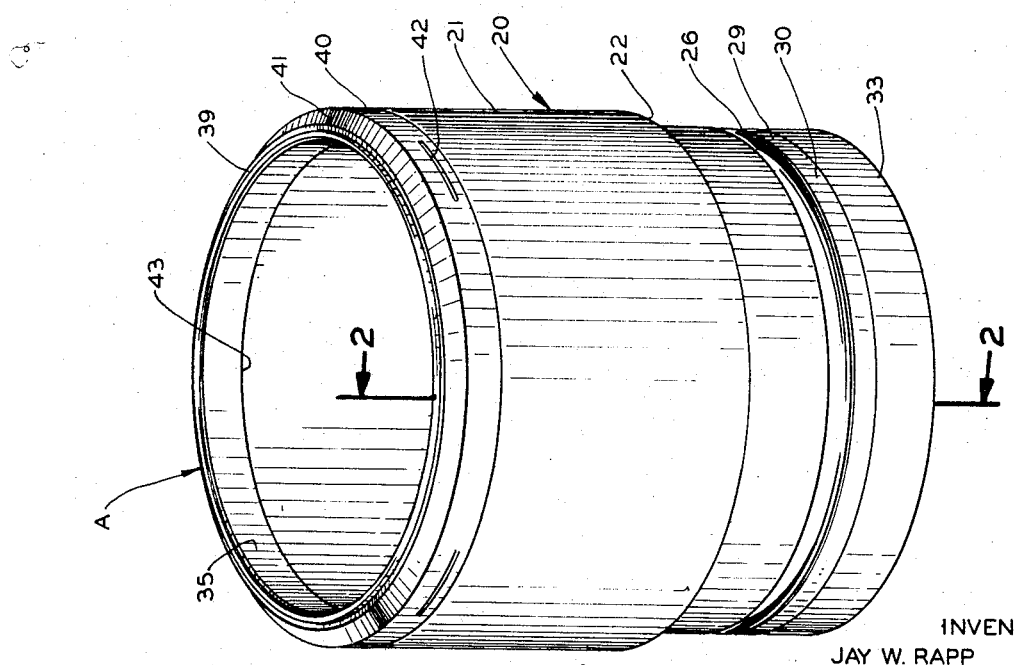

In the accompanying drawings (1 sheet):

FIGURE 1 is a perspective view of a positive pressure applicator constructed in accordance with and embodying the present invention; and FIGURE 2 is a fragmentary vertical sectional view showing the side wall of the applicator in cross section and its operative association to a positive pressure forming device illustrated in dotted lines.

*General description*

Generally speaking, the present invention is based upon a pressure applicator coordinating with a moving plunger to permit the imposition of a fluid pressure such as a vacuum, air or steam pressure, against a web of thermoplastic material such as styrene or a modified polystyrene. In the usual molding process, the web of thermoplastic material is preheated and forced into a die to receive the shape of the die. Generally, a plug or plug assist or so-called male die is employed to urge the preheated portion of the thermoplastic web into the die or die cavity. The employment of fluid pressure subjected against localized areas of the thermoplastic web forces the web against the walls of the die cavity at a more uniform manner and thereby permits the formation of a plastic article having a more uniform wall thickness.

The present positive pressure applicator is generally in the form of a housing which is hollow and designed to extend around a plug or so-called "plug assist." The plug assist extends upwardly through the applicator and is designed to engage the web of thermoplastic material and force the same into a die cavity. The upper portion of the applicator carries a gripping ring assembly which may be a unitary member or provided with special contact surfaces for special applications. The gripping ring engages the web of thermoplastic material and produces an air-tight seal so that the area enclosed by the gripping ring which includes the portion of the web engaged by the plug assist is maintained under a pressure condition.

The positive pressure applicator of the present invention is designed more specifically to fit within a U-shaped groove surrounding each of the plug assists. The applicator is in the form of an assembly where the housing is provided on its undersurface with an annular U-shaped groove for accommodating a unique sealing and strain receiving flexible ring, the latter providing for extensible movement of the housing. The sealing ring is provided with a large circular section which integrally merges into an upstanding annular flange, the flange fitting in the groove formed in the underside of the housing. Furthermore, the circular portion of the ring is provided with an annular U-shaped groove. The entire sealing ring is adapted to deform upon the application of pressure to the housing and will compress permitting the housing to shift downward somewhat in the manner of a bellows. A solid metal supporting ring or shoe is disposed beneath the flexible sealing ring. Similarly disposed beneath the metal supporting ring is another flexible overload supporting ring of a material similar to the material used in the sealing and strain receiving ring.

In copending application Ser. No. 534,325, filed Mar. 15, 1966, a bellows type pressure applicator is disclosed. This type of applicator has been found to be quite efficient for almost all molding operations. However in the molding of thick-walled or substantially thick walled containers, a breakdown of the molding machine may cause two or more layers of thermoplastic web to accumulate in the molding cavity. This web thickness may cause a downward force on a bellows member which may be sufficient to crack the bellows member. The applicator of the present invention is, therefore, formed with a solid-walled housing which is described in more detail hereinbelow.

*Detailed description*

Referring now in more detail and by reference characters to the drawings which illustrate a preferred embodiment of the present invention, A designates a positive pressure applicator which is adaptable for use in a molding machine of the type described in my copending application Ser. No. 534,422 filed Mar. 15, 1966. The positive pressure applicator is designed to extend around a plug assist in a manner more fully described in said application and to maintain a pressure condition on the area enclosed by said positive pressure applicator A.

In order to more fully describe the positive pressure applicator A, it is necessary to briefly describe and illustrate some of the details of construction of the positive pressure forming system in a molding machine. The positive pressure forming apparatus generally includes a plug base 1 upon which are mounted a series of the plug assists or so-called "forming plugs or male dies" P. The plug base 1 is generally mounted on a supporting frame or so-called "lower die frame" 2, which provides for shiftable movement of the forming plugs P. The mechanism for shifting the lower die frame 2 is more fully described and illustrated in copending application Ser. No. 333,440, filed Dec. 26, 1963, now U.S. Patent No. 3,268,952. It is recognized that a series of these male forming plugs P and plug bases 1 are mounted on the lower die frame 2, the latter of which is vertically reciprocable with respect to the moving web of thermoplastic material.

Each of the plug bases 1 generally comprises a bottom wall 3 having an annular flange 4 for accommodating bolts 5 which, in turn, provide securement to the lower die frame 2. Each of the plug bases 1 is further provided with an upstanding enlarged central boss 6, which is centrally apertured in the manner as illustrated in FIGURE 2. Integrally formed with the bottom wall 3 is an upstanding annular flange 7 which is spaced from the exterior wall of the boss 6, thereby forming an annular U-shaped groove 8 around the boss 6. Secured to the upper end of the boss 6 is the forming plug P which is provided with a head portion 9 and an integrally formed base 10. The base 10 is secured to the boss 6 by means of bolts 11. The forming plug P is also provided with a tapered downwardly struck guide flange 12 for seating in the interior of the boss 6.

The positive pressure applicator A generally comprises an outer housing 20 having an annular side wall 21, which may be formed of any suitable lightweight metal, such as aluminum or stainless steel. The annular side wall 21 is reduced near its lower end in the provision of an annular shoulder 22, which is adapted to engage the upper margin 23 of the annular flange 7, thereby providing a lower limit of movement of the housing 20 when the shoulder 22 abuts the margin 23. Spaced upwardly from the lower margin of the side wall 21 is an integrally formed inwardly extending bottom wall 24, which is provided with an enlarged central aperture for accommodating the forming plug P. By further reference to FIGURE 2, it can be seen that the base 10 of the forming plug P extends over the inwardly struck bottom wall 24, thereby holding the entire pressure applicator in the annular groove 8.

By means of the above-outlined construction, the side wall 21 is snugly though nevertheless slidably shiftable in the annular groove 8, thereby providing vertically shiftable movement of the positive pressure applicator A.

The lower margin of the side wall 21 is annularly provided with a downwardly opening U-shape groove 25 for accommodating a rubber sealing and compression ring 26, which generally comprises a circular ring portion 27 and an integrally formed upwardly extending annular flange 28. The flange 28 extends upwardly into the groove 25 in the manner as illustrated in FIGURE 2. Furthermore, the ring portion 27 is provided on its interior surface with an annular groove 28'. In this manner, if air should escape into the area of the sealing ring 26, in a manner to be more fully described hereinafter, the annular groove 28' may be enlarged somewhat inasmuch as it serves as an air pocket. In this manner, the entire sealing ring 26 will be somewhat deformable to fill the space in which it sits. Furthermore, if the housing should be shifted downwardly in a manner to be hereinafter described, the area formed by the groove 28' can be compressed somewhat. Therefore, a very effective pressure seal is maintained. The flange 28 of the sealing ring 26, however, fits loosely into the groove 25.

A vertically shiftable shoe or so-called "slide" 29 is fitted within the U-shaped groove 8 and disposed beneath the annular sealing ring 26. The slide 29 is formed with a horizontal plate 30 and an integrally formed vertically extending guide wall 31 on its interior margin. The slide 29 is annular about the boss 6 and provides a bottom support for the sealing ring 26. Furthermore, it can be seen that the ring portion 27 in the sealing ring 26 is snugly fitted in the space defined by the exterior surface of the guide wall 31 and the interior surface of the upstanding flange 7 on the plug base 1. In this manner, the housing 20 is snugly though nevertheless slidably fitted within the U-shaped groove 8 in the manner as illustrated in FIGURE 2. An annular neoprene sealing ring 32 is fitted in the guide wall 31 and also bears against the exterior surface of the boss 6 as the slide 29 shifts in a vertical direction.

A rubber compensator ring 33 is fitted between the bottom wall of the annular U-shaped groove 8 and the underside of the horizontal plate 30 forming part of the shoe 29 in the manner as illustrated in FIGURE 2. The compensator ring 33 has an overall thickness which is materially less than the thickness of the annular U-shaped groove 8. The compensator ring 33 is formed of a fairly rigid rubber material such as a polybutadiene rubber similar to the type sold under the commercial name Buna-N. The compensator ring 33 is designed to compensate for over-compression of the pressure applicator A in the event of a breakdown in the molding machine. Thus if the web of thermoplastic material which passes through the molding machine should cease moving, or if the machine should jam up during molding operations, a continuing number of plastic articles would form on the plug assist P as the molding operations continue, even though the web of thermoplastic material was not moving. In order to prevent an excess strain on the positive pressure applicator, the rubber compensator ring 33 is designed to compress within the portion of the U-shaped groove 8 in which it is disposed. In this manner, the housing 20 can be continually shifted downwardly to compensate for the extra thickness of plastic material retained on the plug assist P.

The upper margin of the side wall 21 is integrally formed with an enlarged head 34, which is provided with an L-shaped shoulder 35 for accommodating a gripping ring or so-called "seal" 36. The gripping ring 36 may be either a unitary member as shown, or may be provided with special contact surfaces for special applications. The gripping ring 36 is L-shaped in vertical cross section and includes a horizontal portion 37 and an upstanding leg 38, the latter of which integrally merges into an upstanding annular edge 39. The annular edge 39 is designed to engage the web of thermoplastic material w during forming operations. The gripping ring 36 is held in place by means of a retaining ring 40, the latter having an inclined top wall 41, so that it does not engage the web of thermoplastic material w. It should be noted that the retaining ring extends to a point slightly below the upper margin of the gripping ring 36 in order to reinforce the gripping ring 36 against outward movement from pressure in the applicator A. The retaining ring 40, is held in place by means of a spring clip 42, which also extends through apertures formed in the retaining ring 40 and the enlarged head 34. The gripping ring 36 is preferably formed of a linear copolymer of vinylidine fluoride and hexafluoropropylene, more fully described in copending application Ser. No. 534,441, filed Mar. 5, 1966.

The enlarged head 34 provides an upper annular pressure shoulder 43 on its underside and the bottom wall 24 provides a lower pressure shoulder 44 which is opposed to the pressure shoulder 43 in the manner as illustrated in FIGURE 2. Furthermore, it should also be recognized that the plug base 10 of the plug assist P is provided with an aperture 50 for permitting air to pass around the head portion of the plug assist P in a manner to be more fully described in detail hereinafter. The applicators A provide a spring action and gripping action when moved upwardly against the overhead web of heated thermoplastic material which is to be subjected to a forming operation. Such forming takes place against a female die (not shown) located above the web and the plug assists P are located below the web, with the pressure applicator A providing for gripping of the thermoplastic material. The applicator A also provides for the admission of air through the aperture 50 formed in the plug base 10, in order to force the thermoplastic material more rapidly and precisely into the female die. The female die may also make use of a vacuum to aid in the forming operation.

When gaseous pressure is applied, such as compressed air at about 60 p.s.i.g. or broadly a pressure from 5 to 100 p.s.i.g. very precise forming of the thermoplastic web takes place. The applicator is first raised up to the point of loose contact with the web of heated thermoplastic material, the latter being in a semi-fluid state. When the gas pressure, e.g. air or nitrogen, is applied internally to the applicator, it has been found that a controllable gripping action together with a thinning of the contact area or drape is obtained. The air which is admitted to the interior of the applicator A will cause a force against both of the pressure shoulders 43, 44. Since these shoulders have substantially the same size and shape and are located at approximately equal distances from a vertical center line passing through the applicator A, the air pressure will not cause the housing 20 to shift either upwardly or downwardly. However, the sealing ring 26 is flexible and does tend to urge the housing 20 upwardly when no downwardly directed force is applied to the housing 20.

With the applicator A in mechanical contact with the web w and the female die (not shown), the housing 20 is subjected to a downwardly directed force. Hence, the sealing ring 26 will compress slightly permitting downward movement of the housing 20. Furthermore, the annular margin 39 of the gripping ring 36 will engage the underside of the web w. In this connection, it should be understood that the sealing ring 26 and the compensator ring 33 are less stiff than the gripping ring 36 so that either the sealing ring 26 or the compensating ring 33 will begin to flex before the gripping ring 36. When the applicator is in mechanical contact with the web, the ring 26 will provide an upwardly directed force since the latter is in a compression state, thereby urging the gripping ring 36 into fluid-tight contact with the web w. This additional force of the applicator A provides a sealing of the gas pressure and also serves to thin the grip area or drape.

It has been found that this type of pressure applicator has a long life and is capable of accommodating a variation in the linearity of operation in the molding machine. The actual overall deflection of the housing 20 in a normal molding cycle is approximately 0.0010 inch and generally does not exceed 0.0030 inch. When a "jam-up" or malfunction of the molding machine occurs, the housing 20 may deflect as much as 0.0070 inch due to the action of the compensator ring 33. This applicator has been found to be highly efficient in positive pressure applications in molding operations and as indicated leads to compensation for non-linearity of operation in each cavity-plug arrangement of a molding machine.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A pressure applicator operatively disposed around a plug forming die and being movable therewith so that a pressure condition is maintained between said plug forming die and a thermoplastic sheet, said pressure applicator comprising a housing adapted for extensible movement with respect to said plug forming die and said thermoplastic sheet, a compressible and flexible biasing element disposed beneath said housing and engaging a lower portion thereof for permitting extensible and retractable movement of said housing with respect to said sheet and said die, responsive to fluid pressure conditions in said housing, and a gripping member operatively mounted on one end of said housing for engaging said thermoplastic sheet, whereby contact between said engageable means and said sheet will cause a downwardly directed force on said housing causing compression of said biasing element and retraction of said housing.

2. A pressure applicator operatively disposed around a plug forming die and being movable therewith so that a pressure condition is maintained between said plug forming die and a thermoplastic sheet, said pressure applicator comprising a housing adapted for extensible movement with respect to said die and said thermoplastic sheet, a gripping member operatively mounted on one end of said housing for engaging said sheet, said housing being provided with an annular groove on its underside, a flexible sealing ring disposed immediately beneath said groove and having a portion extending into said groove, said sealing ring being constructed of compressible material capable of providing a biasing action thereby permitting extensible and retractable movement of said housing with respect to said sheet responsibe to fluid pressure conditions in said housing, and a retaining ring disposed under said flexible sealing ring, whereby contact between said engageable means and said sheet will cause a downwardly directed force on said housing causing compression of said biasing element and retraction of said housing.

3. The pressure applicator of claim 2 wherein the housing is provided with a pair of opposed flat pressure bearing surfaces.

4. The pressure applicator of claim 2 wherein a flexible compensator ring is operatively disposed beneath said retaining ring, said compensator ring being yieldable under force and capable of compensating for extra large extensible movements of the housing.

5. The pressure applicator of claim 2 wherein the flexible sealing ring includes an annular body portion with an annular upstanding flange, said flange extending into the groove on said housing and being capable of creating a pressure sealing condition therein, and an annular recess formed in said body portion providing compressible movement of said sealing means.

6. The pressure applicator of claim 2 wherein the flexible sealing ring has a greater degree of elasticity than said engageable means.

7. The pressure applicator of claim 4 wherein the flexible sealing ring and the compensator ring have a combined elasticity which is greater than the elasticity of said engageable means.

8. Pressure applicator operatively disposed around a plug forming die so that a pressure condition is maintained between said plug forming die and a thermoplastic sheet, and wherein said pressure applicator is disposed within a groove formed around said plug forming die; said pressure applicator comprising a housing adapted for extensible movement with respect to said thermoplastic sheet, a flexible gripping ring operatively mounted on the upper end of said housing for engaging said thermoplastic sheet, said housing having a groove formed on its bottom wall, a flexible sealing ring being located in the groove around said plug forming die and being disposed beneath the bottom wall of said housing, said flexible sealing ring having a circular portion which fits snugly against the wall of the groove around said plug forming die, an upwardly extending flange formed with said circular portion and extending upwardly into the groove formed on the underside of said housing, an interiorly presented annular compression groove formed on the circular portion of said flexible sealing ring, metallic shoe disposed beneath said flexible sealing ring, and a sealing gasket disposed in said metallic shoe and being engageable against the interior wall of said plug forming die, whereby contact between said gripping ring and said thermoplastic sheet will cause a downwardly directed force on said housing causing compression of said flexible sealing ring and downward movement of said housing.

9. Pressure applicator of claim 8 wherein a flexible compensator ring is disposed beneath said shoe and which is capable of compensating for extra large extensive movements of said housing.

References Cited

UNITED STATES PATENTS

| | | | |
|---|---|---|---|
| 2,230,189 | 1/1941 | Ferngren | 18—19 |
| 3,060,507 | 10/1962 | Knowles | 18—19 X |
| 3,268,952 | 8/1966 | Shelby | 18—19 |

WILLIAM J. STEPHENSON, *Primary Examiner.*